(12) United States Patent
Keremedjiev (10) Patent No.: US 9,602,190 B2
(45) Date of Patent: Mar. 21, 2017

(54) LOW LATENCY GLOBAL COMMUNICATION THROUGH WIRELESS NETWORKS

(71) Applicant: Mark Keremedjiev, Washington, DC (US)

(72) Inventor: Mark Keremedjiev, Washington, DC (US)

( * ) Notice: Subject to any disclaimer, the term of this patent is extended or adjusted under 35 U.S.C. 154(b) by 91 days.

(21) Appl. No.: 14/683,694

(22) Filed: Apr. 10, 2015

(65) Prior Publication Data

US 2015/0295638 A1 Oct. 15, 2015

Related U.S. Application Data

(60) Provisional application No. 61/978,266, filed on Apr. 11, 2014.

(51) Int. Cl.
*H04B 7/185* (2006.01)
*H04L 12/859* (2013.01)
*G06Q 40/04* (2012.01)
*G06Q 20/38* (2012.01)

(52) U.S. Cl.
CPC ....... *H04B 7/18584* (2013.01); *G06Q 20/382* (2013.01); *G06Q 40/04* (2013.01); *H04B 7/18504* (2013.01); *H04L 47/2475* (2013.01); *G06Q 2220/00* (2013.01)

(58) Field of Classification Search
CPC ............ H04B 7/18504; H04B 7/18584; H04L 47/2475
USPC ....................................................... 455/13.1
See application file for complete search history.

(56) References Cited

U.S. PATENT DOCUMENTS

| 5,467,345 | A | * | 11/1995 | Cutler, Jr. | H04B 7/1856 370/229 |
| 5,561,837 | A | * | 10/1996 | Muller | H04B 7/18576 455/12.1 |
| 6,431,496 | B1 | * | 8/2002 | Salvatore | B64G 1/242 244/158.6 |
| 6,446,905 | B1 | * | 9/2002 | Campbell | B64G 1/14 244/135 R |
| 7,151,929 | B1 | * | 12/2006 | Jenkin | H04B 7/18582 455/12.1 |
| 2002/0063188 | A1 | * | 5/2002 | Steinsiek | B64G 1/1078 244/172.4 |
| 2002/0080871 | A1 | * | 6/2002 | Fallon | H04L 12/1895 375/240 |

(Continued)

*Primary Examiner* — Wesley Kim
*Assistant Examiner* — Raj Chakraborty
(74) *Attorney, Agent, or Firm* — Brundidge & Stanger, P.C.

(57) ABSTRACT

Embodiments describe a communication system optimized for low latency and includes one or more high altitude platforms disposed at intervals in data communication with each other forming a communication path and at least two network centers separated from each other by a predetermined distance, where the high altitude platforms receive data signals from the network centers, travel along a communication path between the network centers, forming a data relay and transferring the data signals along the communication path. Additional embodiments may include intervals that are at different altitudes or different distances and/or provide one or more high altitude platforms that comprise at least one of satellites, high altitude balloons, or unmanned aerial vehicles.

20 Claims, 10 Drawing Sheets

(56) References Cited

U.S. PATENT DOCUMENTS

| | | | | |
|---|---|---|---|---|
| 2003/0040273 | A1* | 2/2003 | Seligsohn | B64B 1/44 455/12.1 |
| 2005/0022500 | A1* | 2/2005 | Buehler | F02K 9/50 60/223 |
| 2012/0302160 | A1* | 11/2012 | Silny | H04B 7/18508 455/12.1 |
| 2015/0280810 | A1* | 10/2015 | Beals | H04B 7/18521 455/13.1 |

* cited by examiner

LOW LATENCY GLOBAL COMMUNICATION THROUGH WIRELESS NETWORKS

CROSS-REFERENCE TO RELATED APPLICATION

This application claims priority to U.S. Provisional Patent Application Ser. No. 61/978,266, filed on Apr. 11, 2014, the complete disclosure of which, in its entirety, is herein incorporated by reference.

BACKGROUND

Technical Field

The embodiments described herein generally relate to the field of wireless communication, and, more particularly, to low latency global communications within a wireless network.

Description of the Related Art

Contemporary global wireless communication networks are designed to provide the broadest coverage possible. Frequently, a secondary consideration in the design of such networks is the bandwidth provided by individual links and throughout the entire global system. Latency of communications within the global wireless communication network, if given any consideration at all, is merely treated as a tertiary consideration. However, for certain applications of global communications, latency is a priority. For such applications, the only alternative is terrestrial communication cables. For example, Atlantic Crossing 1 (AC-1) is an optical submarine telecommunications cable system linking the United States and three European countries. Project Express, another optical transatlantic cable under development by Hibernia Networks, claims it will be the lowest latency transatlantic cable when put into service.

Wireless communication networks, however, offer significant advantages in certain communications environments compared to terrestrial (e.g., submarine) communication cables. What is needed, therefore, is low latency global wireless communications network.

SUMMARY

In view of the foregoing, an embodiment herein provides a communication system comprising: of one or more high altitude platforms disposed at intervals in data communication with each other forming a communication path and at least two network centers separated from each other by a predetermined distance, wherein the one or more high altitude platforms receive data signals from the network centers, travel along a communication path between the network centers, forming a data relay and transferring the data signals along the communication path. Further embodiments provide intervals that are at different altitudes or different distances and/or provide one or more high altitude platforms that comprise at least one of satellites, high altitude balloons, or unmanned aerial vehicles. Additionally, the predetermined altitude may be greater than 50,000 feet above a ground surface, and at least one network communication center may be fixed to the ground surface.

According to additional embodiments described herein, each of the one or more high altitude platforms is configured to: receive a data signal from one of the network centers and transmit the data signal received, to the other network center when within line of sight of the other network center, or to an adjacent high altitude platform when not in line of sight to a network center. Moreover, when the one or more high altitude platforms comprise satellites, the satellites may be disposed at a low earth orbit and spaced apart along the communication path in a predetermined configuration in multiple orbital planes. Furthermore, when data signals may travel between multiple orbital planes and the spacing of satellites may changes with time. In addition, the data relay between the network centers using the one or more high altitude platforms reduces latency between the network centers, thereby enabling optimization of the latency of the transfer of all types of data including financial market and trading information.

Such embodiments may further comprise a ground station comprising a control system configured to control lateral and vertical movement of the one or more high altitude platforms; control the one or more high altitude platforms to maintain optimal positions for reduced latency in real-time; and orchestrate the retrieval of one or more high altitude platforms for servicing or re-use. Moreover, the intervals between the one or more high altitude platforms may be controlled based on: a launching time of each one or more high altitude platforms, using on-board propulsion; and adjusting the shape or density of the one or more high altitude platforms to navigate with wind.

Additional embodiments disclosed herein include network centers that are configured to transmit data signals to each of the one or more high altitude platforms and the one or more high altitude platforms that are configured to transmit data signals to one or more high altitude platforms adjacent thereto. Furthermore, at least one of the one or more high altitude platforms may comprise a communication payload including a steerable antenna to communicate with others of the one or more high altitude platforms.

According to yet other embodiments described herein, a satellite is configured to receive a data signal from the network center and retransmit the data signal to the other network center while within line of sight of the other network center; and perform a hand-off operation to adjacent satellite when the network centers are within line of sight. Additionally, the high altitude platforms may be configured to be continuously repopulated and to move in a coordinated manner from one network center to another network center while providing data relay for transferring the data signals between the network centers and may also include a tracking device configured to track a location of, for example, individual high altitude balloons. In addition, at least one of the one or more high altitude platforms comprises a communication payload for communicating with the network centers. Moreover, the communication path between network centers may be optimized in real time such that the communication path with the lowest total latency is used.

Additional embodiments disclosed herein include sea-based equipment in communication with the one or more high altitude platforms. Additionally, embodiments include may include data signals that are in the form of raw market data to be encrypted and compressed prior to transferring and/or may include data signals in the form of market transaction requests to be encrypted and compressed prior to transferring. Furthermore, the one or more high altitude platforms may be retrieved in a controlled manner from water for servicing and launching for re-use.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. For example, files herein refer to collections of data that are generally larger than will fit in an individual wireless transmission.

The embodiments described herein provide a highly efficient, low-latency global wireless communications network. For certain global communications, the emphasis of conventional global wireless networks on increasing the geographic coverage and/or increasing available bandwidth is insufficient when latency is a priority and generally seek to minimize the latency between two endpoints of any communication. Examples of global communications with low-latency requirements include real-time applications and high frequency trading between international, financial centers. With high frequency trading, for example, information asymmetry enables traders to outmaneuver the market and a trader who has knowledge of what the other markets are doing before other traders may obtain a benefit from such knowledge. As described in further detail below, the claimed invention include relays of high altitude platforms to realize significantly reduced latencies over wireless intercontinental communications or intercontinental terrestrial (e.g., submarine) communication cables.

For example, the current state of the art in submarine communication cables includes the AC-1 cable from New York City to London, with an estimated round-trip latency of 64.8 ms. Another submarine cable, still in development and claiming to be the fastest transatlantic cable, is Project Express from Hibernia Network®. Project Express claims to deliver a round-trip latency of 59.6 ms when service becomes available. The latency of intercontinental terrestrial (e.g., submarine) communication cables, however, is driven by the speed of light through fiber. The speed of light through a fiber is roughly $2.044 \times 10^8$ m/s. In contrast, the speed of light through the atmosphere (e.g., air) is roughly $2.989 \times 10^8$ m/s—almost 50% faster.

The straight-line distance between New York and London is 5576 km—which implies the fastest possible round trip signal is 37.2 ms (i.e., minimized latency, which assumes no fiber, transmission delays, etc.—just the speed of light). Theoretically, therefore, up to 22.4 ms of improvement can be realized over existing intercontinental terrestrial (e.g., submarine) communication cables. As described in further detail below, certain embodiments of the claimed invention provide a constellation of low-cost, high altitude platforms (e.g., satellites, balloons or UAVs) that provide a continuous cross-link between two communication points with significantly lower latency. For example, in certain embodiments, while the path length of the high altitude platforms is slightly longer that the ideal straight-line distance, the speed of light through air is faster than through fiber resulting in an overall reduction in latency.

Referring now to the drawings, and more particularly to FIGS. 1 through 10, where similar reference characters denote corresponding features consistently throughout the figures, there are shown preferred embodiments.

Figure 1:
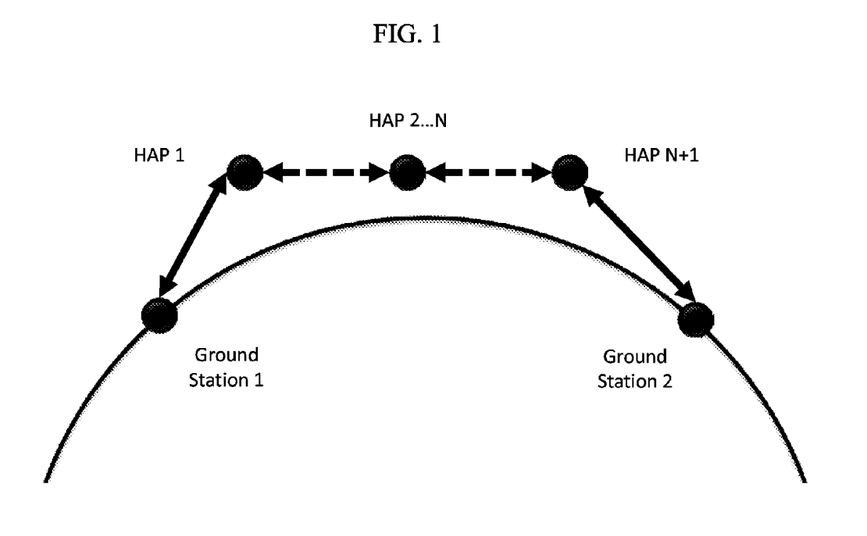
FIG. 1 is a diagram illustrating high altitude platform relay constellation according to embodiments described herein.

FIG. 1 is a diagram illustrating high altitude platform relay constellation according to embodiments described herein. As shown in FIG. 1, several high altitude platforms (HAP) are shown (e.g., HAP 1, HAP 2 . . . N, HAP N+1) over the Atlantic Ocean. According to FIG. 1, several high altitude platforms (e.g., with altitudes >50,000 ft) are in formation over the Atlantic creating a constant communications line between two endpoints (e.g., NYSE in New York City and LSE in London). For example, each endpoint includes at least one ground station to transmit to and receive from the closest HAP entry point. Thereafter, various intermediary HAP constellation points transmit to one another across the Atlantic Ocean, and finally transmit down to the ground station and the corresponding endpoint. Compared to conventional intercontinental communications, the system of FIG. 1 enables continuous, fast coverage for data transfer.

As described in further detail below, a constellation of high altitude platforms may include, but is not limited to, satellites, high altitude balloons and high altitude unmanned aerial vehicles (UAVs).

For example, as shown in FIG. 1, embodiments of the claimed invention include a constellation of satellites in low earth orbit (LEO) to provide low latency intercontinental communications. While not shown in FIG. 1, one embodiment herein includes near continuous coverage with 60 satellites in four orbital planes (such as polar orbits in a "string of pearls" configuration), where each is at a 1200 km altitude with 15 satellites equally spaced along the path. Moreover, each plane is separated by 45 degrees.

FIG. 1 also includes ground stations at the endpoints in New York and London. According to certain embodiments, the ground stations are not physically located at ultimate a communication endpoint (e.g., communications between the NYSE and LSE), but rather located nearby with clear sightlines. Such an embodiment adds minimal latency (e.g., less than 1 ms).

Figure 2:
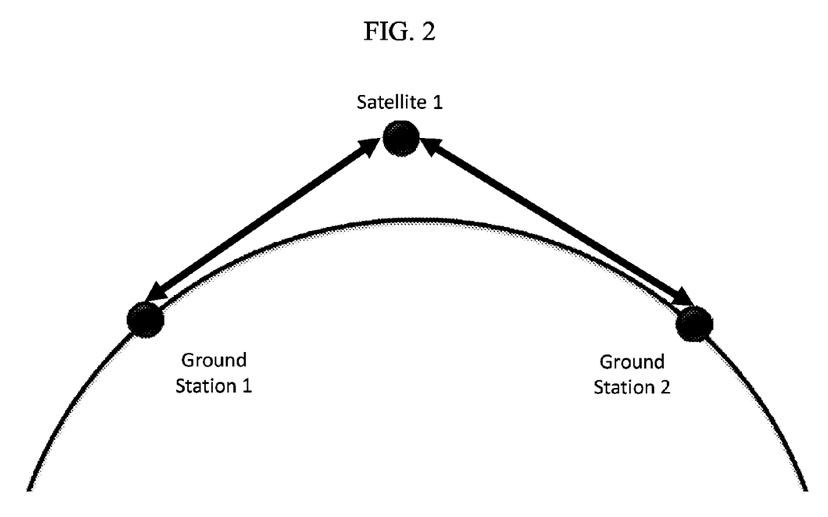
FIG. 2 is a schematic diagram illustrating a direct relay system according to embodiments described herein.

FIG. 2 illustrates a direct relay system according to embodiments described herein. According to the embodiment shown in FIG. 2, each satellite (e.g., Satellite 1) receives a signal from the ground station (e.g., Ground Station 1) and retransmits to other ground station (e.g. Ground Station 2) while line of sight is available. Each satellite can perform the relay for a few minutes per pass with a small overlap in coverage with other satellites. According to such an embodiment, the system hands off a task to the next satellite (not shown in FIG. 2 as soon as it can see both ground stations). According to one embodiment of FIG. 2, Satellite 1 is situated at approximately a 1200 km altitude, which provides a balance between time on a communication target against a distance to a communication target and further provides minimal latency.

Figure 3:
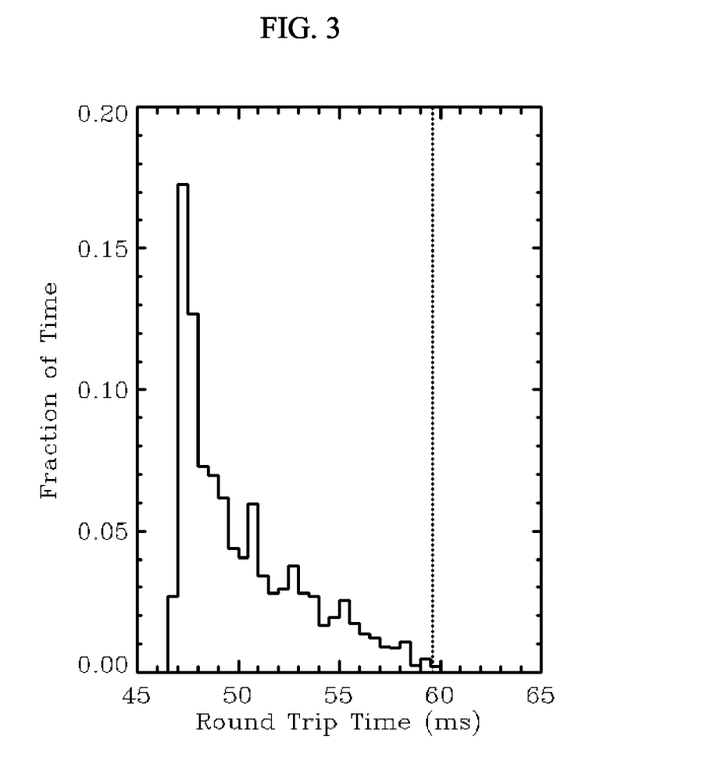
FIG. 3 illustrates the projected latencies of the embodiment shown in FIG. 2 compared to a baseline latency of a terrestrial intercontinental communications cable.

As shown in FIG. 3, the latencies of the embodiment shown in FIG. 2 offer an improvement of the currently planned terrestrial transatlantic communications (i.e., Global Express). According to projections shown in FIG. 3, the round-trip latency to/from exchanges using the embodiment of FIG. 2 include a best case of 46.6 ms; worst case of 59.6 ms; mean of 50.3 ms; and a median of 49.2 ms. FIG. 3 also assumes the following latency to ground stations: in New York (from NYSE to Francis S. Gabreski Airport): 0.5747 ms; in London (from LSE to Hedgerley: 0.1684 ms). FIG. 3 further assumes a 0.5 ms uplink/encryption time, 0.5 ms retransmission time, 0.5 ms downlink/decryption time and a total of 1.5 ms hardware latency each way. According to the specifics of this constellation design, the round trip latency of the embodiment shown in FIG. 2 is faster than the baseline (offered by Global Express) 65.9% of the time.

Figure 4:
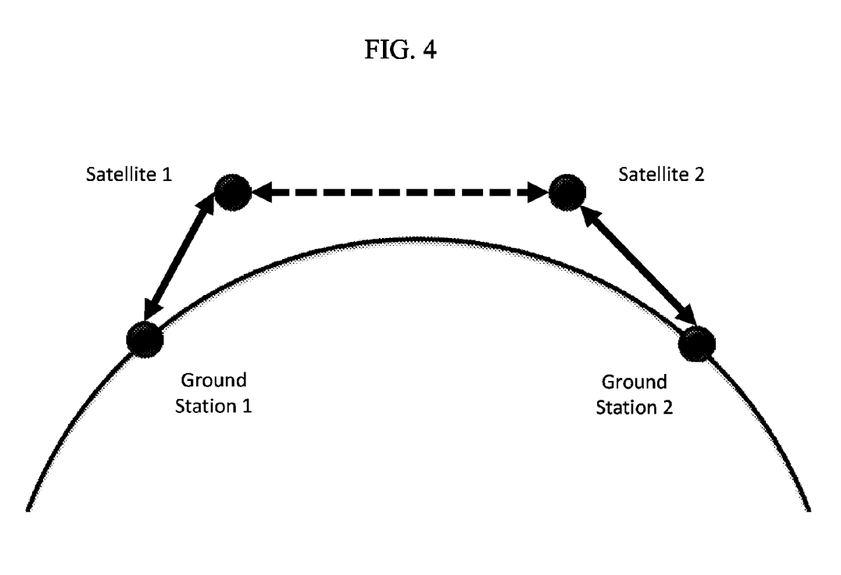
FIG. 4 is a schematic diagram illustrating a direct relay with Sat2Sat Comms according to embodiments described herein.

The embodiment of FIG. 2 may be further developed to include the embodiment of FIG. 4, which includes satellite-to-satellite communications. As shown in FIG. 4, to increase coverage, the embodiment shown optionally relays through different satellites (e.g., Satellite 1 and 2). According to such an embodiment, a ground station (e.g., Ground Station 1) transmits to a satellite (e.g., Satellite 1). Thereafter, Satellite 1 can relay to ground station (e.g., Ground Station 2) if visible or to another satellite (Satellite 2) which can relay to ground station. While the embodiment shown in FIG. 4 allows for greater coverage, it also increases the complexity of the overall system. For example, the embodiment shown in FIG. 4 may include the same number of satellites, same orbit as other embodiments but adds additional hardware.

Figure 5:
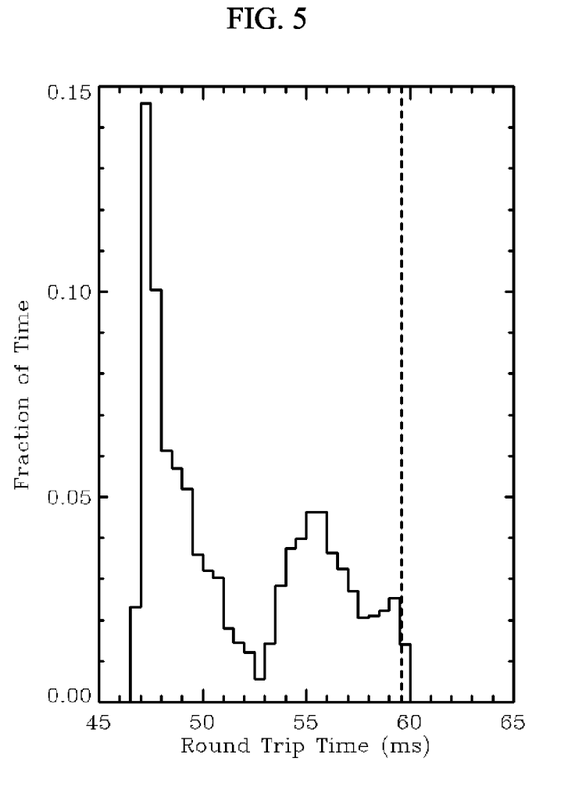
FIG. 5 illustrates the projected latencies of the embodiment shown in FIG. 4 compared to a baseline latency of a terrestrial intercontinental communications cable.

As shown in FIG. 5, the latencies of the embodiment shown in FIG. 4 offer an improvement of the currently planned terrestrial transatlantic communications (i.e., Global Express). According to projections shown in FIG. 5, the round-trip latency to/from exchanges using the embodiment of FIG. 4 (assuming 60 satellites in four polar orbital planes such, where each satellite is at a 1200 km altitude with 15 satellites equally spaced along each orbital plane; moreover, each plane is separated by 45 degrees) include a best case of 46.6 ms; worst case of 59.6 ms; mean of 51.8 ms; and a median of 50.2 ms. FIG. 5 also assumes the following latency to ground stations: in New York (from NYSE to Francis S. Gabreski Airport): 0.5747 ms; in London (from LSE to Hedgerley: 0.1684 ms). FIG. 5 further assumes a 0.5 ms uplink/encryption time, 2×0.5 ms retransmission time, 0.5 ms downlink/decryption time and a total of 2.0 ms hardware latency each way. According to current weather models, the round trip latency of the embodiment shown in FIG. 5 is faster than the baseline (offered by Global Express) 91.8% of the time.

As shown in FIGS. 1-5, embodiments using satellites result in an average of 9 ms reduction in round trip latencies (i.e., 15% faster than the baseline) and the best configurations result in 13 ms reduction latency (22% faster than the baseline). As a result, Satellite relays according to the embodiments disclosed herein enable low latency communications with significantly lower latency than what is currently available.

In addition to the embodiments shown in FIGS. 1-5, further embodiments of the claimed invention include high altitude balloons (HAB). According to one embodiment, a constellation of HABs at approximately 67,000 feet is used to provide a low latency intercontinental communications link. Compared to the embodiments described above, HABs have a potentially lower latency than satellite solution, offer easy repair and upgrade capability and provide a large bandwidth at a lower cost. Significant considerations include a lack of active controls for steering the HABs, a dependence on weather for performance, and high operations costs.

According such an embodiment, each HAB is at an altitude of 67,000 feet (optimal to provide lower overall wind velocities and less variability in wind gusts), with a line of sight distance of 760 km, requiring at least 7 balloons for a transatlantic communications.

Additional embodiments to what is described above includes using a "conveyor belt" approach. For example, according to the conveyor belt approach, balloons are launched from New York and fly over to London. Assuming a 30 kph speed, each HAB will cross the Atlantic in approximately one week. The conveyor belt approach ensures a constant refresh of hardware and balloons. According to additional embodiments, the travel paths of the HABs will travel with the jet streams and further enable near 100% uptime. Further embodiments include a fixed relay balloon stationary over terrestrial endpoints and launching one balloon per day, year around, to maintain coverage.

Figure 6:
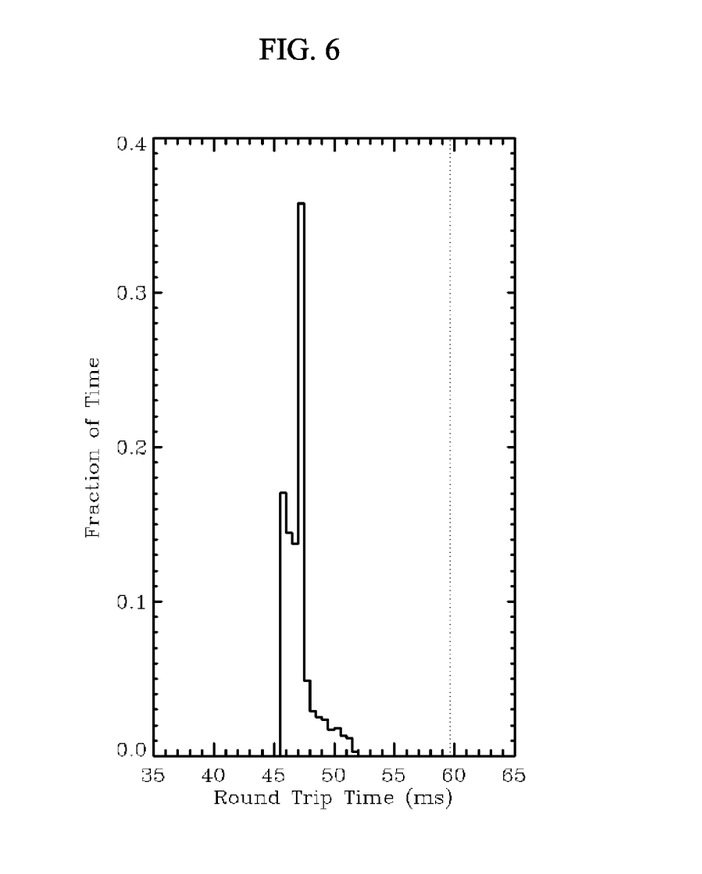
FIG. 6 illustrates the projected latencies of a high altitude balloon in modeled realistic conditions compared to a baseline latency of a terrestrial intercontinental communications cable.

FIG. 6 illustrates the projected latencies of a high altitude balloon constellation in modeled realistic conditions compared to a baseline latency of a terrestrial intercontinental communications cable. FIG. 6 assumes 3 days of balloons launching every 3 hours from New York. According to projections shown in FIG. 6, the round-trip latency to/from exchanges using the HAB embodiments describe above include a best case of 45.58 ms; worst case of 51.66 ms; mean of 47.12 ms; and a median of 47.15 ms. FIG. 6 further assumes a 0.5 ms uplink/encryption time, 7×0.5 ms retransmission time, 0.5 ms downlink/decryption time and a total of 4.75 ms hardware latency each way.

As shown in FIG. 6, embodiments using HABs relay result in a low latency communications that is faster than a baseline, fiber optic approach greater than 90% of the time. Best configuration result in a 17 ms reduction in latency (i.e., 29% faster than the baseline). Even accounting for significant wind, the present embodiments provide a 10 ms reduction in latency. As a result, HAB relays according to the embodiments disclosed herein enable low latency communications with significantly lower latency than what is currently available.

Figure 7:
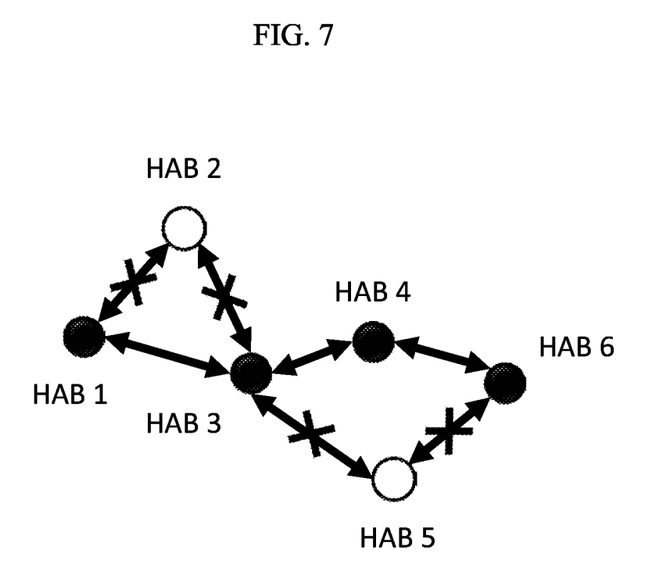
FIG. 7 illustrates the route optimization that can be employed to improve latency.

Additional HAB embodiments include tracking and route optimization. As shown in FIG. 7, various HABs (e.g., HAB 2 and 5) may become unavailable or non-optimal for various reasons (poor visibility, loss of line of sight communications, poor weather conditions). Under such conditions, other HABs may be utilized to optimize the route between endpoints. For example, by uploading GPS coordinates to a satellite constellation (e.g., the Iridium satellite constellation), present embodiments monitor exact the locations of various balloons. Moreover, using the knowledge of such balloon locations enables embodiments of the claimed invention to optimize routes (e.g., based on distance, HAB condition, etc.) and maintain minimal latencies.

In addition to the embodiments described above, some companies are trying to develop high altitude unmanned aerial vehicle (UAV) platforms than can loiter for long periods of time. It therefore, becomes possible to use a constellation of high altitude UAVs at 67,000 ft to provide intercontinental communications. Compared to the embodiments described above, UAV platforms provide the potential for lower latency while offering ease of maintenance and upgradability. Furthermore, UAV platforms can provide significant bandwidth and locations of individual UAVs is highly deterministic.

Similar to previous embodiments, the UAV embodiments includes a number of UAVs flying between two endpoints (e.g., Northeast Philadelphia Airport, USA and Rochester Airfield, UK), optionally includes a fixed relay (which may include a stationary or circling UAV or a HAB) over important communication endpoints (e.g., NYSE in New York and LSE in London) to provide longer range and may include 7 active UAVs that provide continuous crosslink between the two intercontinental endpoints.

Figure 8:
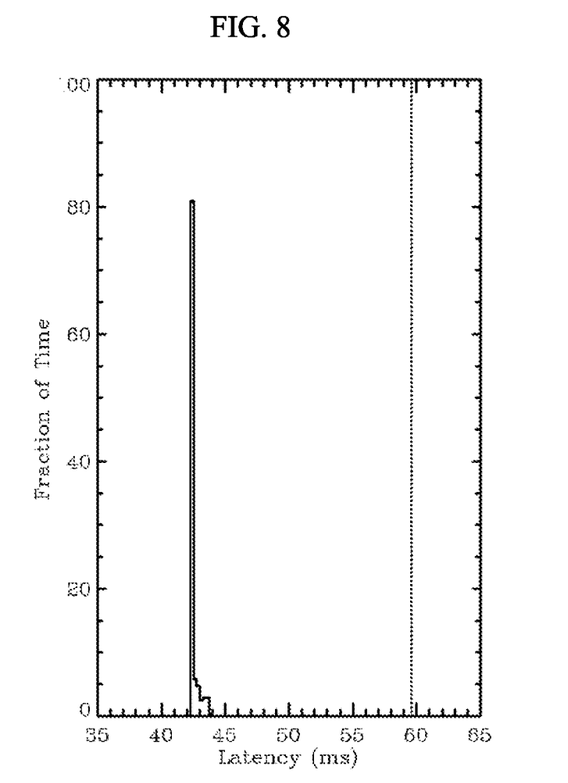
FIG. 8 illustrates the projected latencies of a UAV in realistic conditions compared to a baseline latency of a terrestrial intercontinental communications cable
Figure 10:
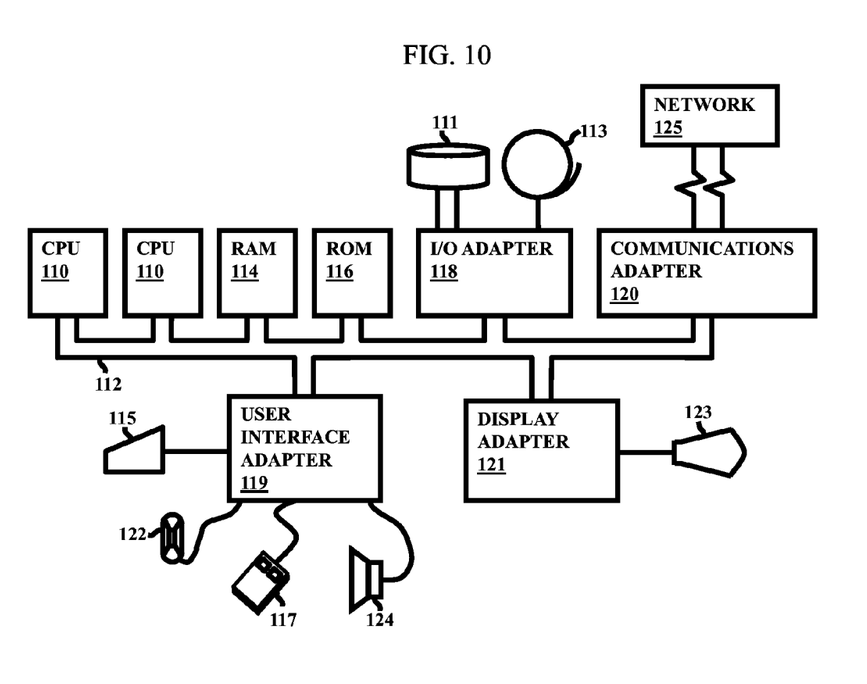
FIG. 10 illustrates a schematic diagram of a computer architecture used in accordance with the embodiments described herein.

FIG. 8 illustrates the projected latencies of a UAV in realistic conditions compared to a baseline latency of a terrestrial intercontinental communications cable. According to projections shown in FIG. 8, the round-trip latency to/from exchanges using the UAV embodiments describe above include a best case of 42.35 ms; worst case of 43.75 ms; mean of 42.48 ms; and a median of 42.35 ms. FIG. 10 further assumes a 0.25 ms uplink/encryption time, 7×0.25 ms retransmission time, 0.25 ms downlink/decryption time and a total of 2.25 ms hardware latency each way. According to the above assumptions, the round trip latency of the embodiment shown in FIG. 8 is faster than the baseline (offered by Global Express) 100% of the time.

Additional embodiments include multiple UAV pathway stops between to communications endpoint. According to such embodiments, there is a separation between the pathway endpoints within a communications segment (e.g., a path a UAV may take and the time the UAV is airborne) and the communications endpoints (communications between New York and London). For example, one embodiment includes three segments between the communication endpoints of New York and London: 1) NY to Newfoundland; 2) Newfoundland to Azores; and 3) Azores to London. Assuming there are 3 UAVs in a conveyor belt configuration in segment 1, 4 UAVs in segment 2 and 4 UAVs in segment 3—with a 0.25 ms uplink/encryption time, 0.25 ms retransmission time, 0.25 ms downlink/decryption time for a total hardware latency of 3.25 ms each way—such an embodiment provides a total round trip latency of 51.83 ms with near 100% uptime.

Figure 9:
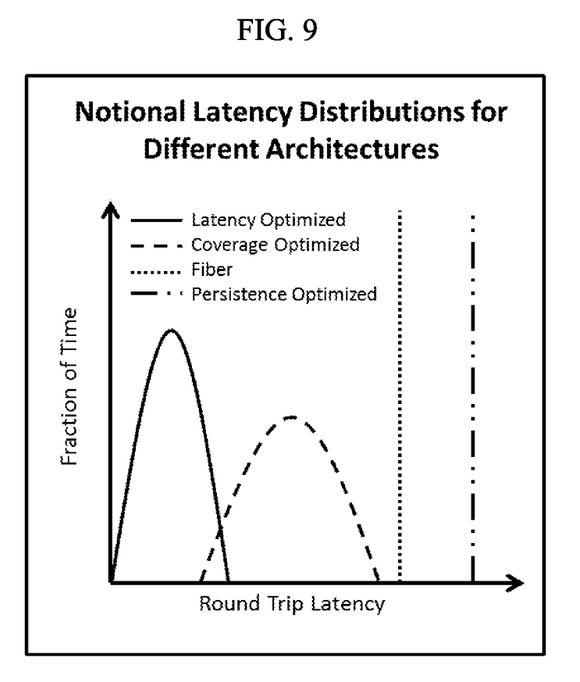
FIG. 9 illustrates latency distributions of various satellite configurations, according to embodiments described herein.

FIG. 9 illustrates latency distributions for satellite embodiments shown above compared to a terrestrial intercontinental communication cable. FIG. 9 illustrates the different latency distributions projected for different satellite embodiments. For example, when the communications system is optimized for latency, such a system achieves the fastest set of latencies but may come at the expense of coverage. Alternatively, communications systems that emphasize geographic coverage trade off a reduction in latency to ensure more people have access. As described above, a fiber-based solution always has the same latency. Also shown in FIG. 9 is a persistent solution (such as a geostationary satellite), which has continuous coverage and high bandwidth, but the slowest latency.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein may comprise hardware and software elements, wherein the embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 10. This schematic drawing illustrates a hardware configuration of an information handling/computer system in accordance with the embodiments herein. The system comprises at least one processor or central processing unit (CPU) 110. The CPUs 110 are interconnected via system bus 112 to various devices such as a random access memory (RAM) 114, read-only memory (ROM) 116, and an input/output (I/O) adapter 118. The I/O adapter 118 can connect to peripheral devices, such as disk units 111 and tape drives 113, or other program storage devices that are readable by the system. The system can read the inventive instructions on the program storage devices and follow these instructions to execute the methodology of the embodiments herein. The system further includes a user interface adapter 119 that connects a keyboard 115, mouse 117, speaker 124, microphone 122, and/or other user interface devices such as a touch screen device (not shown) to the bus 112 to gather user input. Additionally, a communication adapter 120 connects the bus 112 to a data processing network 125, and a display adapter 121 connects the bus 112 to a display device 123 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A communication system comprising:
two or more high altitude platforms disposed at intervals in data communication with each other forming a communication path; and
at least two network centers separated from each other by a predetermined distance, wherein the two or more high altitude platforms receive data signals from the network centers, travel along a communication path between the network centers, forming a data relay and transferring the data signals along the communication path,
wherein the intervals are at different altitudes or different distances,
wherein the two or more high altitude platforms comprise satellites; and
the satellites are disposed at a low earth orbit and are spaced apart along the communication path in a predetermined configuration in multiple orbital planes,
wherein each satellite is configured to:
receive a data signal from the network center and retransmit the data signal to the other network center while within line of sight of the other network center: and
in response to an overlap in coverage with an adjacent satellite, perform a hand-off operation to the adjacent satellite when the network centers are within line of sight.

2. The communication system of claim 1, wherein each of the two or more high altitude platforms is configured to:
receive a data signal from one of the network centers and transmit the data signal received, to the other network center when within line of sight of the other network center, or to an adjacent high altitude platform when not in line of sight to a network center.

3. The communication system of claim 1, wherein the data signals travel between the multiple orbital planes and spacing of the satellites changes with time.

4. The communication system of claim 1, wherein the two or more high altitude platforms further comprise at least one of high altitude balloons, or unmanned aerial vehicles.

5. The communication system of claim 1, wherein each high altitude platform is greater than 50,000 feet above a ground surface, and wherein at least one network center is fixed to the ground surface.

6. The communication system of claim 1, wherein the data relay between the network centers using the two or more high altitude platforms reduces latency between the network centers and the data signals comprise financial market and trading information, thereby enabling optimization of the latency of the transfer of the financial market and trading information.

7. A communication system comprising:
two or more high altitude platforms disposed at intervals in data communication with each other forming a communication path;
at least two network centers separated from each other by a predetermined distance, wherein the two or more high altitude platforms receive data signals from the network centers, travel along a communication path between the network centers, forming a data relay and transferring the data signals along the communication path;
a ground station comprising a control system configured to:
control lateral and vertical movement of the two or more high altitude platforms;
control the two or more high altitude platforms to maintain optimal positions for reduced latency in real-time; and
orchestrate the retrieval of two or more high altitude platforms for servicing or re-use,
wherein the intervals between the two or more high altitude platforms are controlled based on:

a launching time of each two or more high altitude platforms, using on-board propulsion; and adjusting the shape or density of the two or more high altitude platforms to navigate with wind.

8. The communication system of claim 7, wherein the network centers are configured to transmit data signals to each of the two or more high altitude platforms and the two or more high altitude platforms are configured to transmit data signals to two or more high altitude platforms adjacent thereto.

9. The communication system of claim 8, wherein at least one of the two or more high altitude platforms comprises a communication payload including a steerable antenna to communicate with others of the two or more high altitude platforms.

10. The communication system of claim 7, wherein the high altitude platforms are configured to be continuously repopulated and to move in a coordinated manner from one network center to another network center while providing data relay for transferring the data signals between the network centers.

11. The communication system of claim 7, further comprising a tracking device configured to track a location of each high altitude platform.

12. The communication system of claim 7, wherein at least one of the two or more high altitude platforms comprise a communication payload for communicating with the network centers.

13. The communication system of claim 7, wherein the communication path between network centers is optimized in real time such that the communication path with the lowest total latency is used.

14. The communication system of claim 7, wherein the data signals are in the form of raw market data to be encrypted and compressed prior to transferring.

15. The communication system of claim 7, wherein the two or more high altitude platforms are retrieved in a controlled manner from water for servicing and launching for re-use.

16. The communication system of claim 7, wherein the data signals comprised market transaction requests to be encrypted and compressed prior to transferring.

17. The communication system of claim 7, wherein each of the two or more high altitude platforms is configured to:
receive a data signal from one of the network centers and transmit the data signal received, to the other network center when within line of sight of the other network center, or to an adjacent high altitude platform when not in line of sight to a network center.

18. The communication system of claim 7, wherein the data signals travel between the multiple orbital planes and spacing of the satellites changes with time.

19. The communication system of claim 7, wherein the data relay between the network centers using the two or more high altitude platforms reduces latency between the network centers and the data signals comprise financial market and trading information, thereby enabling optimization of the latency of the transfer of the financial market and trading information.

20. The communication system of claim 7, wherein the two or more high altitude platforms comprise at least one of satellites, high altitude balloons, or unmanned aerial vehicles.

* * * * *